US012766971B2

(12) United States Patent
Husberg et al.

(10) Patent No.: US 12,766,971 B2
(45) Date of Patent: Oct. 20, 2026

(54) COMPUTER-IMPLEMENTED METHOD OF BRAKE MANAGEMENT

(71) Applicant: VOLVO TRUCK CORPORATION, Gothenburg (SE)

(72) Inventors: Tobias Husberg, Kareby (SE); Ragunath Balakrishnan, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 230 days.

(21) Appl. No.: 18/538,618

(22) Filed: Dec. 13, 2023

(65) Prior Publication Data

US 2024/0198808 A1 Jun. 20, 2024

(30) Foreign Application Priority Data

Dec. 16, 2022 (EP) .................................... 22214331

(51) Int. Cl.
*B60L 7/26* (2006.01)
*B60L 7/18* (2006.01)
(Continued)

(52) U.S. Cl.
CPC .................. *B60L 7/26* (2013.01); *B60L 7/18* (2013.01); *B60L 58/15* (2019.02); *B60L 58/26* (2019.02);
(Continued)

(58) Field of Classification Search
None
See application file for complete search history.

(56) References Cited

U.S. PATENT DOCUMENTS

| | | | | |
|---|---|---|---|---|
| 11,192,453 | B2 | 12/2021 | Park | |
| 2016/0082860 | A1* | 3/2016 | Marchal | H01M 10/625 320/136 |
| 2020/0031357 | A1* | 1/2020 | Ling | B60L 7/10 |
| 2020/0086875 | A1* | 3/2020 | Hoffmann | B60W 30/18127 |

(Continued)

FOREIGN PATENT DOCUMENTS

| | | | |
|---|---|---|---|
| SE | 2150176 | A1 | 8/2022 |
| WO | 2014003637 | A1 | 1/2014 |
| WO | 2022214190 | A1 | 10/2022 |

OTHER PUBLICATIONS

Greg Pannone, "Technical Analysis of Vehicle Load Reduction Potential For Advanced Clean Cars", Apr. 29, 2015, California Air Resources Board and the California Environmental Protection Agency (Year: 2015).*

Extended European Search Report in corresponding European Application No. 22214331.5 dated Jun. 6, 2023 (13 pages).

(Continued)

*Primary Examiner* — Navid Z. Mehdizadeh
*Assistant Examiner* — Jason R Roberson
(74) *Attorney, Agent, or Firm* — Jeffri A. Kaminski; Venable LLP

(57) ABSTRACT

A computer-implemented method of brake management in an electric or hybrid electric heavy-duty vehicle that has batteries which are configured to absorb energy from regenerative braking is provided. Topographic data containing information about an upcoming downhill slope is obtained. A state of charge target (SOC target) below 100% for said batteries is determined. Based on the obtained topographic data, a total brake power required for maintaining the speed of the heavy-duty vehicle at or below a selected speed limit of the heavy-duty vehicle throughout the travel in the downhill slope is determined. The determined total brake power is in the form of at least one of regenerative braking,
(Continued)

auxiliary braking and service braking of the heavy-duty vehicle. The speed of the heavy-duty vehicle when travelling in said downhill slope is controlled by applying said determined total brake power such that the state of charge of the batteries remains below or equal to said SOC target throughout the travel in the downhill slope.

18 Claims, 5 Drawing Sheets

(51) Int. Cl.
*B60L 58/15* (2019.01)
*B60L 58/26* (2019.01)

(52) U.S. Cl.
CPC ....... *B60L 2240/12* (2013.01); *B60L 2240/26* (2013.01); *B60L 2240/42* (2013.01); *B60L 2240/46* (2013.01); *B60L 2240/48* (2013.01); *B60L 2240/545* (2013.01); *B60L 2240/642* (2013.01); *B60L 2240/662* (2013.01); *B60L 2240/70* (2013.01); *B60L 2260/20* (2013.01)

(56) References Cited

U.S. PATENT DOCUMENTS

2022/0097676 A1* 3/2022 Gesang ................ B60W 20/14
2022/0332194 A1 10/2022 Lindberg
2023/0303052 A1* 9/2023 Gesang ................ B60W 30/18

OTHER PUBLICATIONS

Feng, J., Tian, Z., Cui, J., Zhou, F. et al., "Downhill Safety Assistant Driving System for Battery Electric Vehicles on Mountain Roads," SAE Technical Paper 2019-01-2129, 2019, doi:10.4271/2019-01-2129 (15 pages).

Economic and Social Council; "Proposal for a Supplement to UN Regulation No. 13 (Heavy vehicle braking)"; Submitted by the expert from the International Organization of Motor Vehicle Manufacturers; Economic Commission for Europe; Inland Transport Committee; World Forum for Harmonization of Vehicle Regulations; Working Party on Automated/Autonomous and Connected Vehicles; Seventh session; Geneva, Sep. 21-25, 2020; Item 8 (c) of the provisional agenda; ECE/TRANS/WP.29/GRVA/2020/37 (6 pages).

* cited by examiner

COMPUTER-IMPLEMENTED METHOD OF BRAKE MANAGEMENT

TECHNICAL FIELD

The disclosure relates generally to brake management method. In particular aspects, the disclosure relates to a computer-implemented method of brake management. In particular the disclosure may be implemented for an electric or hybrid electric heavy-duty vehicle that has batteries which are configured to absorb energy from regenerative braking. The disclosure can be applied in heavy-duty vehicles, such as trucks, buses, and construction equipment. Although the disclosure may be described with respect to a particular vehicle, the disclosure is not restricted to any particular vehicle.

BACKGROUND

Heavy-duty vehicles need brakes that can provide high braking power. Electric and hybrid electric heavy-duty vehicles may also be configured to recuperate energy by regenerative braking, typically during downhill travel. For long and steep downhill travels, the high power output may put high stress and high charge requirement on the batteries in which the regenerative energy is stored. This may result in reduced durability and reduced energy storage capacity of the batteries.

SUMMARY

According to a first aspect of the disclosure, there is provided a computer-implemented method of brake management in an electric or hybrid electric heavy-duty vehicle that has batteries which are configured to absorb energy from regenerative braking, the method comprising:

obtaining, by a processor device of a computer system, topographic data containing information about the topography of an upcoming part of a road along which the heavy duty vehicle is currently travelling, the topographic data including information about an upcoming downhill slope, determining, by the processor device, a state of charge target (SOC target) below 100% for said batteries, determining, by the processor device, based on the obtained topographic data, a total brake power required for maintaining the speed of the heavy-duty vehicle at or below a selected speed limit of the heavy-duty vehicle throughout the travel in the downhill slope, the determined total brake power being in the form of at least one of regenerative braking, auxiliary braking and service braking of the heavy-duty vehicle, and controlling, by the processor device, the speed of the heavy-duty vehicle when travelling in said downhill slope, by applying said determined total brake power such that the state of charge of the batteries remains below or equal to said SOC target throughout the travel in the downhill slope. The first aspect of the disclosure may seek to provide a brake management method which is energy efficient and which reduces stressing of the batteries. A technical benefit may include that, by setting a SOC target less than 100% and by selecting the available braking options so that the SOC target is not exceeded during the downhill travel, while still maintaining the desired speed, energy is not lost in vain, and the battery health status can be maintained satisfactorily.

The SOC target may be determined in various ways. Optionally, it may be determined (e.g. calculated or estimated) individually for each downhill slope, whereas in other options there may be a predefined SOC target irrespective of the character of the individual slope. Furthermore, optionally, the SOC target may be determined based on the current SOC of the batteries. Optionally, the SOC target may be determined based on the coverage of the topographic data (e.g. how many kilometers ahead is included in that data). Optionally, the SOC target may be determined as part of a route planning, wherein a SOC target is determined in advance for each downhill slope before the vehicle starts driving along the route. Optionally, however, the processor device may determine the SOC target one downhill slope at the time, as the vehicle drives along the route. Furthermore, optionally, the processor device may determine a new SOC target during the downhill travel, and may thus revise the SOC target while travelling in the downhill slope. The charge capacity of batteries when the state of charge approaches 100%. The power that can be recovered by regenerative braking is greatly reduced as SOC approaches 100%. For example, the possible recoverable regenerative power may be half the power at 98% SOC compared to the recoverable power at 95% SOC. Thus, it makes sense to set a SOC target below 100% for the batteries.

The possibility to use at least one of regenerative braking, auxiliary braking and service braking, is advantageous as different brake strategies may be used under different circumstance. For instance, if the current SOC of the batteries is full at the top of the slope (prioritizing drive range), then the processor device determines that auxiliary brakes and/or service brakes should be applied during the downhill slope. On the other hand if the current SOC is low when starting the downhill slope the processor device may advantageously determine to perform regenerative braking so is to charge the batteries, but may also advantageously combine this with either auxiliary braking or service braking for peak shaving in order to avoid overcharging the batteries. However, in connection with peak shaving, the processor device may suitably take into consideration the effect on the cooling system. An auxiliary brake, such as an electric brake resistor or mechanical retarder, may when it is applied considerably increase the temperature of the coolant in the cooling system. This is at least partly reflected below.

Optionally, the heavy-duty vehicle comprises a cooling system for cooling said batteries and/or power electronics of the vehicle, the method further comprising:

determining, by the processor device, a threshold temperature of a coolant of the cooling system, and controlling, by the processor device, the speed of the heavy-duty vehicle when travelling in said downhill slope, by applying said determined total brake power such that the temperature of the coolant remains below or equal to said threshold temperature throughout the travel in the downhill slope. A technical benefit may include that not only the durability of the batteries and other power electronics are taken into account but also the functioning of the coolant system. Thus, the processor device may in some scenarios determine that in order to avoid overshooting the SOC target and the threshold temperature of the coolant, the service brakes should be applied during at least part of the downhill travel, either along or together with the other braking options. Applying the service brakes will neither increase the temperature of the coolant, nor will it charge the batteries, but may cause fading of the brakes.

Thus, unnecessary usage of service brakes should be avoided. It may be conceivable, in at least some braking scenarios, to intermittently apply the service brakes (pump braking), to reduce the risk of fading. Thus, optionally, the processor device may alternate between for example the auxiliary brake and the service brake. It may be noted that batteries and other power electronics normally operate better at temperatures below 50° C., and should desirable be at least below 60° C. However, auxiliary brakes such as retarders normally operate at higher temperatures, such as between 80° C. and 100° C. to create a large temperature different relative the ambient, for improved performance. This however, leads to increased temperature for the batteries and power electronics. Therefore, it is advantageous to monitor the temperature of the coolant relative said threshold temperature in order to avoid straining the batteries and/or other power electronics. Optionally, however, it is conceivable to provide a plurality of cooling systems, such as one cooling system for the auxiliary brakes and another separate cooling system for the batteries and power electronics.

Optionally, the method further comprises:

determining, by the processor device, a brake power distribution of said total brake power to be applied, said determined brake power distribution being a mixture of simultaneous:

regenerative braking and auxiliary braking, regenerative braking and service braking, auxiliary braking and service braking, or regenerative braking, auxiliary braking and service braking, wherein said controlling of the speed by applying said determined total brake power, comprises:

applying said determined total brake power in the form of said determined brake power distribution.

A technical benefit may include that the processor device may, based on the current situation, determine a suitably mixture which takes into account energy recuperation, battery durability, cooling system performance and/or brake fading, etc. For instance, if current SOC is already high, the processor device may select a brake power distribution based on auxiliary braking and service braking, wherein the auxiliary braking is kept at a level to avoid too high rise of coolant temperature. In other cases, regenerative braking may be combined with service braking and/or auxiliary braking to take advantage of the available energy for charging the batteries, while avoiding exceeding the SOC target, by implementing a peak shaving strategy using the auxiliary braking and/or service braking. Suitably, the auxiliary braking may be used for peak shaving as long as the coolant temperature does not become too high, whereas the service braking may be used for peak shaving when both SOC and coolant temperature are at a high level. As mentioned above, it is desirable to avoid too high coolant temperatures, since batteries subjected to too high temperatures will have reduced durability.

Optionally, the method further comprises:

determining, by the processor device, based on the obtained topographic data, a maximum energy that is recoverable through regenerative braking throughout the travel in the downhill slope without exceeding said SOC target and without exceeding said speed limit, and determining, by the processor device, said brake power distribution based on said determined maximum energy.

A technical benefit may include that the processor device can determine how much energy can be absorbed by the batteries through regenerative braking without exceeding the SOC target, and thus how much of the brake power distribution that can be allocated to regenerative braking on the one hand and how much should be allocated to auxiliary braking and/or service braking on the other hand. The brake power that is needed to maintain the vehicle at a desired speed may be conveniently determined, based on different input parameters, including vehicle weight and the inclination/grade of the downhill slope. In its turn the brake energy will depend on the brake power and the length of the downhill slope. The longer the downhill slope, the more brake energy will need to be applied (assuming other parameters are unchanged). For instance, in a scenario in which SOC is 50% at the start of the downhill slope, the processor device may determine to provide one brake power distribution for a relative short downhill slope (allowing a high proportion of regenerative braking power relative to auxiliary and/or service braking power), whereas the processor device may determine to provide another brake power distribution for a relatively long downhill slope (setting a low proportion of regenerative braking power).

Optionally, the method further comprises:

receiving, by the processor device, ambient temperature data containing information about the ambient temperature and coolant temperature data containing information about the temperature of the coolant in the cooling system, and determining, by the processor device, said brake power distribution based on said received ambient temperature data and coolant temperature data.

A technical benefit may include that since there is a heat transfer between the coolant and the ambient, by knowing the ambient temperature, the processor device may determine the change of the coolant temperature during auxiliary braking, and may therefore, based on such determination, select a suitable brake power distribution. Hereby, auxiliary braking may suitably form part of the brake power distribution to a certain proportion, without risking that the coolant temperature exceeds the determined threshold temperature of the coolant. As mentioned previously, optionally, there may be provided separate cooling systems for auxiliary brake components on the one hand and batteries and/or other power electronics on the other hand.

Optionally, the method further comprises:

determining, by the processor device, the heat capacity of the coolant, and determining, by the processor device, said brake power distribution based on said determined heat capacity.

A technical benefit may include that by having information about the heat capacity of the coolant, the processor device may determine how much auxiliary braking power may be applied in order to maintain the coolant temperature at or below the determined threshold temperature.

Optionally, said topographic data comprises information about the grade of the downhill slope, the method further comprising:

determining, by the processor device, the total weight of the heavy-duty vehicle, including the weight of any trailing vehicle part, wherein said act of determining the total brake power required for maintaining the speed of the heavy-duty vehicle at or below the selected speed limit, comprises determining the total brake power based on the determined total weight and the grade of the downhill slope.

A technical benefit may include that determining the brake power needed based on the weight and the grade of the downhill slope is convenient and provides sufficient accuracy. Suitably, the brake power determination may be based on the well-known formula for an inclined plane: $a=m\cdot g\cdot \sin(\theta)$, where a is the acceleration, m is the vehicle mass, g is the gravity of Earth, and the angle θ is the grade of the downhill slope. Thus, in order to avoid acceleration and to maintain a current cruising speed the braking force should suitably balance the acceleration force (and thus the braking power can be roughly estimated to the acceleration times the vehicle speed, neglecting any other power-affecting factors such as rolling resistance and aero resistance).

Optionally, the method further comprises:

determining, by the processor device, said maximum energy based on the determined total weight and grade of the downhill slope.

A technical benefit may include that this provides a convenient way to determine the maximum energy that is recoverable through regenerative braking throughout the travel in the downhill slope without exceeding said SOC target and without exceeding said speed limit. By knowing the length of the downhill slope the brake energy needed for maintaining the vehicle at said speed limit can be calculated/estimated and depending on the current SOC of the batteries the brake power distribution may be appropriately be determined by the processor device.

Optionally, the method further comprises:

determining, by the processor device, the total brake power, $BP^{tot}$, based on the following relationships:

$$BP^{tot} = k\cdot(GF - RR - AR),$$

where k is a combined efficiency coefficient which is based on the efficiencies of components such as rear-axle, gearbox, electric machine, inverter and batteries;

GF is the grade force calculated as $mg\cdot\sin(\theta)\cdot v$, where m is the mass of the heavy duty vehicle, g is the gravity, v is the speed of the vehicle and θ is arctan(grade/100);

RR is the rolling resistance calculated as $mg\cdot\cos(\theta)\cdot v$;

AR is the aero resistance calculated as $$1/2\cdot\rho\cdot CdA\cdot v^3,$$

wherein ρ is the density of air, and CdA is the coefficient of aerodynamic drag of the heavy-duty vehicle.

A technical benefit may include that by utilizing this relationship, the processor device may determine the total brake power more accurately.

Optionally, the method further comprises:

determining, by the processor device, a combined brake power deliverable from regenerative braking and auxiliary braking without exceeding said SOC target, and upon determination that said deliverable combined brake power is insufficient to maintain said selected speed limit throughout the travel in the downhill slope, controlling, by the processor device, service brakes of the heavy-duty vehicle to provide additional brake power so as to maintain the speed at or below said selected speed limit throughout the travel in the downhill slope.

A technical benefit may include, that energy recuperation is used as much as appropriate (without stressing the batteries) while avoiding unnecessary fading and wear of brake pads. The processor device may suitably allocate as much brake power as possible to regenerative braking so that as much energy as possible is recovered, but when if there too much brake energy is needed in the downhill slope, the auxiliary brake may be used for peak shaving, thereby avoiding exceeding the SOC target. Furthermore, the processor device may also set a limit to the braking power of auxiliary brake, so as to avoid the temperature of the coolant exceeding the temperature threshold of the coolant, and thus allocate remaining brake power need of the total brake power to the service brake. This is at least partly reflected below.

Optionally, the method further comprises:

determining, by the processor device, an aggregated brake power deliverable from regenerative braking and auxiliary braking without exceeding said threshold temperature of the coolant, and upon determination that said deliverable aggregated brake power is insufficient to maintain said selected speed limit throughout the travel in the downhill slope, controlling, by the processor device, service brakes of the heavy-duty vehicle to provide additional brake power so as to bring down the speed or maintain (e.g. by intermittently applying the service brakes) the speed at or below said selected speed limit throughout the travel in the downhill slope.

Thus, the processor device may in this way appropriately control the energy recuperation without stressing the battery and may spare the service brake by only using the service brakes when needed to avoid stressing the battery and exceeding said temperature threshold of the coolant. By using the service brakes to bring down the speed, the power required for braking at the lower speed will also be reduced. Such reduced braking power may then be at a sufficiently low level for it to be provided solely by regenerative braking and/or auxiliary braking. Thus, optionally, the processor device may be configured to determine a brake power level at which the regenerative braking and/or auxiliary braking is capable to provide said brake power level, wherein the processor device may control the service brakes to reduce the current speed of the vehicle to a reduced speed at which the required brake power to maintain the reduced speed is at said determined brake power level, and then the processor device may maintain the reduced speed by controlling the regenerative brakes and/or auxiliary brakes to be applied.

Optionally, said topographic data comprises information about the length of the downhill slope, the method further comprising:

determining, by the processor device, said brake power distribution based on the length of the downhill slope.

A technical benefit may include that, by having information about the length of the downhill slope, the total brake energy that will be required may be determined by the processor device, and thus, the processor device may determine, how much of that total brake energy may be allocated to regenerative braking without exceeding the SOC target, and thus how much of the total brake energy that should be allocated to the auxiliary brake and/or service brake. This is also at least partly reflected below.

Optionally, the method further comprises:

determining, by the processor device, said maximum energy based on the length of the downhill slope.

Thus, by having information about the length of the downhill slope, the total brake energy that will be required may be determined by the processor device.

Optionally, said auxiliary braking is performed by the processor device activating a mechanical retarder and/or an electric brake resistor of the heavy-duty vehicle. A technical benefit may include that mechanical retarders and electric brake resistors are readily available auxiliary brake solutions. It should, however, be noted that the auxiliary braking may be conceived in other ways than just by these two examples. Thus, optionally, the auxiliary brake may comprise an energy consuming device, such as a fan or a compressor, wherein the braking energy is converted into operating such an energy consuming device of the vehicle.

Optionally, said topographic data is obtained from a Geographic Information System (GIS).

A technical benefit may include that the topographic data be conveniently provided to the processor device by allowing the GIS and the processor device to be in operative communication with each other. The GIS may suitably be a local system installed on the vehicle. However, it is also conceivable to have a remote GIS, which communicates wirelessly, e.g. via telematics with the processor device. The topographic data may, for example, cover several kilometers of the upcoming road, such as 3-5 kilometers. Thus, the acquired topographic data may in each instance normally include topographic data for a limited length of the road as a whole, i.e. the topographic data may include information about an upcoming road segment. Suitably, as the vehicle travels on that road segment, new topographic data may be acquired, for a new upcoming road segment. The new upcoming road segment may at least partly overlap the previous road segment. Thus, it should be understood that the obtaining of the topographic data by the processor device may be performed repeatedly, either continuously or at certain time intervals (for example every second).

According to a second aspect of the disclosure, there is provided a computer system comprising a processor device configured to perform the method of the first aspect, including any of the examples presented herein. The computer system of the second aspect of the disclosure may seek to provide the same benefits as the method of the first aspect, including any examples thereof.

According to a third aspect of the disclosure, there is provided a vehicle comprising a processor device configured to perform the method of the first aspect, including any of the examples presented herein. The vehicle of the third aspect of the disclosure may seek to provide the same benefits as the method of the first aspect, including any examples thereof.

According to a fourth aspect of the disclosure, there is provided a computer program product comprising program code for performing, when executed by the processor device, the method of the first aspect, including any of the examples presented herein. The computer program product of the fourth aspect of the disclosure may seek to provide the same benefits as the method of the first aspect, including any examples thereof.

According to a fifth aspect of the disclosure, there is provided a control system comprising one or more control units configured to perform the method of the first aspect, including any of the examples presented herein. The control system of the fifth aspect of the disclosure may seek to provide the same benefits as the method of the first aspect, including any examples thereof.

According to a sixth aspect of the disclosure, there is provided a non-transitory computer-readable storage medium comprising instructions, which when executed by the processor device, cause the processor device to perform the method of the first aspect, including any of the examples presented herein. The non-transitory computer-readable storage medium of the sixth aspect of the disclosure may seek to provide the same benefits as the method of the first aspect, including any examples thereof.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

When a heavy-duty vehicle is driving in a downhill slope, the required brake power to maintain the vehicle speed, is normally much higher compared to what is needed for braking a passenger car. For heavy-duty vehicles which are equipped with batteries that may absorb regenerative braking energy, long and/or steep downhill slopes may therefore present a challenge, since the batteries may not be able to absorb all the brake energy that is regenerated. Fully charging the batteries causes the batteries to become stressed, resulting in shorter lifetime and reduced drive range. Thus, while it is desirable to regenerate as much energy as possible, since simple service braking is not only a “waste of energy” but also causes the brakes to fade, there is a limit as to how much of the regenerated energy that can be absorbed, and additionally there is the aspect of maintaining good battery health by avoiding fully charging the batteries. According to the present disclosure a SOC target less than 100% is set in order to avoid stressing the batteries, and a total brake power required for maintaining the vehicle speed within a certain speed limit is determined. The determined brake power is then allocated by the processor device in such manner that the SOC of the batteries will not exceed the SOC target during the downhill travel. Thus, the processor device, may allocate brake power (of the total brake power) to regenerative braking to such extent that the SOC target is not exceeded, and allocate any remaining brake power needed to other brakes of the vehicle. Therefore, for a short and/or low grade downhill slope the entire braking may be allocated to regenerative braking if the current SOC is at a level that allows the batteries to absorb all regenerative energy without exceeding the SOC target, whereas in other cases when the current SOC is already at a high level and/or the downhill slope is longer and/or steeper, the processor device will set a lower or no regenerative brake power, and will control the auxiliary brake and/or service brake to provide a large portion of the required total brake power.

Figure 1:
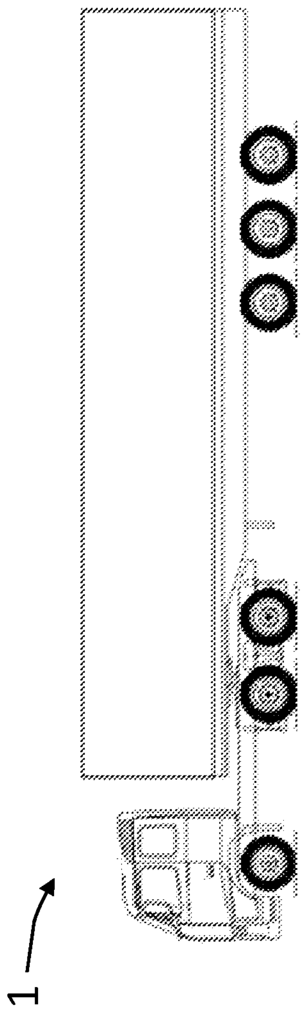
FIG. 1 illustrates schematically a heavy-duty vehicle according to at least one example of the disclosure.

FIG. 1 illustrates schematically a heavy-duty vehicle 1 according to at least one example of the disclosure. In this example, the heavy-duty vehicle 1 is in the form of a tractor unit which is pulling a trailer unit. The tractor unit may for instance be a battery electric vehicle or a hybrid electric vehicle. Although a specific vehicle combination has been illustrated, it should be understood that the teachings of the present disclosure may also be implemented in other types of vehicles, such as busses and construction equipment. The illustrated vehicle 1 comprises a cabin in which a driver may operate the vehicle. However, it should be understood that the teachings in this disclosure may also be implemented in an autonomous (self-driving) vehicle.

Figure 2:
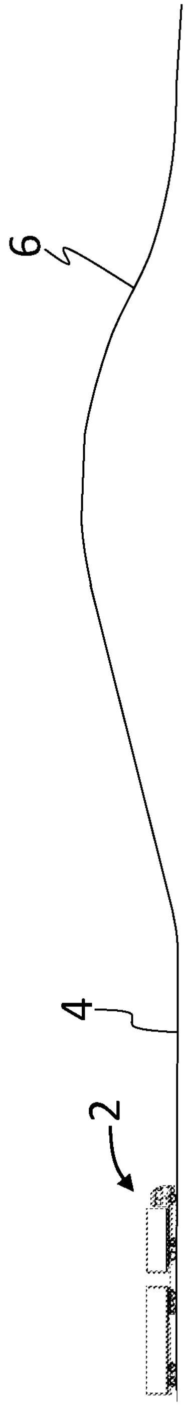
FIG. 2 illustrates schematically another heavy-duty vehicle according to at least another example of the disclosure, wherein the heavy-duty vehicle is travelling on a road.

FIG. 2 illustrates schematically another heavy-duty vehicle 2 according to at least another example of the disclosure, wherein the heavy-duty vehicle is travelling on a road 4. The road includes a downhill slope 6, which will be discussed in more detail later. In FIG. 2, the illustrated vehicle 2 is a heavy-duty vehicle combination which comprises a towing vehicle and a trailer which is towed by the towing vehicle. The towing vehicle is here illustrated in the form of a truck and the trailer is illustrated in the form of a full trailer. It should however be understood that in other examples the trailer may be a semi-trailer. It should also be understood that in other examples the towing vehicle may tow more than one trailer. It should further be understood that the general teachings of this disclosure is not limited to heavy-duty vehicle combinations, but may be implemented for single vehicles as well, such as for a single heavy-duty vehicle, for instance a truck, which does not necessarily need to have a trailer connected.

Figure 3:
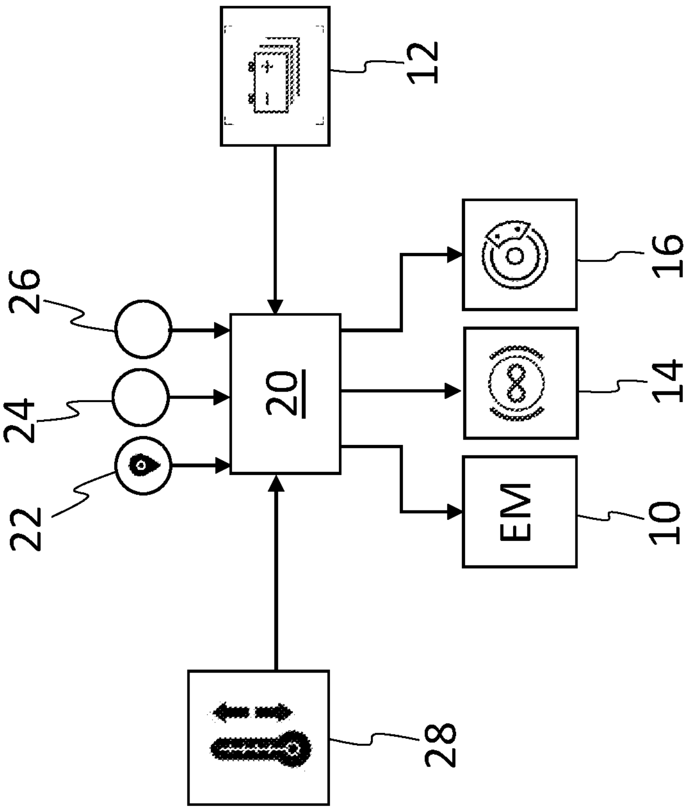
FIG. 3 illustrates schematically vehicle components that may be included when performing the computer-implemented method according to at one example of the disclosure.

FIG. 3 illustrates schematically vehicle components that may be included when performing the computer-implemented method according to at one example of the disclosure. Vehicles, such as the vehicles 1, 2 in FIGS. 1 and 2 may include various brake systems. In FIG. 3 there is schematically illustrated a regenerative brake system 10, in which an electric traction motor may be used as a generator for regenerating energy that may be absorbed and stored by batteries 12 of the vehicle. The stored battery energy may then be re-used for propelling the vehicle. FIG. 3 also illustrates an auxiliary brake system 14, for example including a mechanical retarder or an electric brake resistor, or including any other suitable energy-consuming device. FIG. 3 further discloses a service brake system 16, wherein brake pads may be used to create friction to the wheels in order to decelerate the vehicle (or counteract acceleration of the vehicle). The vehicle further comprises a processor device 20, which is operatively connected to each one of the regenerative brake system 10, the auxiliary brake system 14 and the service brake system 16. Thus, the processor device 20 may control each one of the brake systems 10, 14, 16 individually or in combination to provide a brake power to the vehicle.

The vehicle may have a plurality of different input devices/systems 22, 24, 26 which may provide different types of information to the processor device 20. For simplicity, FIG. 3 only illustrates three input devices/systems 22, 24, 26, however, it should be understood that there may be many more. Examples of input devices/systems may be different sensors, such as speed sensors, load sensors, user interface, etc. One of said input devices/systems may be a system 22 from which the processor device 20 may obtain information about an upcoming part of a road along which the vehicle is currently travelling. For instance, it may be in the form of a GIS. More specifically, the input device/system, such as the GIS 22 may provide topographic data containing information about the topography of an upcoming part of the road. The topographic data may thus include information about an upcoming downhill slope, such as the downhill slope 6 illustrated in FIG. 2.

As illustrated in FIG. 3, the processor device 20 may suitably also be in operative communication with the batteries 12, and may thus obtain information on a current state of charged (current SOC) of the batteries 20. Furthermore, as also illustrated in FIG. 3, the processor device 20 may obtain information about the temperature of a coolant of a cooling system 28 of the vehicle, which cooling system 28 may be used for cooling the batteries 12 and/or power electronics of the vehicle. For instance, the processor device 20 may be in operative communication with a temperature sensor that measures the temperature of the coolant in the cooling system 28.

In operation, the processor device 20 will obtain topographic data from one of the input devices 22, 24, 26, such as the GIS 22. The topographic data contains information about the topography of an upcoming part of a road along which the heavy duty vehicle is currently travelling, the topographic data including information about an upcoming downhill slope (such as the downhill slope 6 illustrated in FIG. 2). Further, the processor device 20 will determine a state of charge target (SOC target) below 100% for the batteries 12. The processor device 20 will, based on the obtained topographic data, determine a total brake power required for maintaining the speed of the heavy-duty vehicle at or below a selected speed limit of the heavy-duty vehicle throughout the travel in the downhill slope, the determined total brake power being in the form of at least one of regenerative braking (using the electric traction motor of the regenerative brake system 10), auxiliary braking (using the auxiliary brake system 14, for example including a mechanical retarder or an electric brake resistor), and service braking (using the service brake system 16). The processor device 20 will control the speed of the heavy-duty vehicle when travelling in the downhill slope by applying the determined total brake power such that the state of charge of the batteries 12 remains below or equal to the SOC target throughout the travel in the downhill slope.

Figure 4:
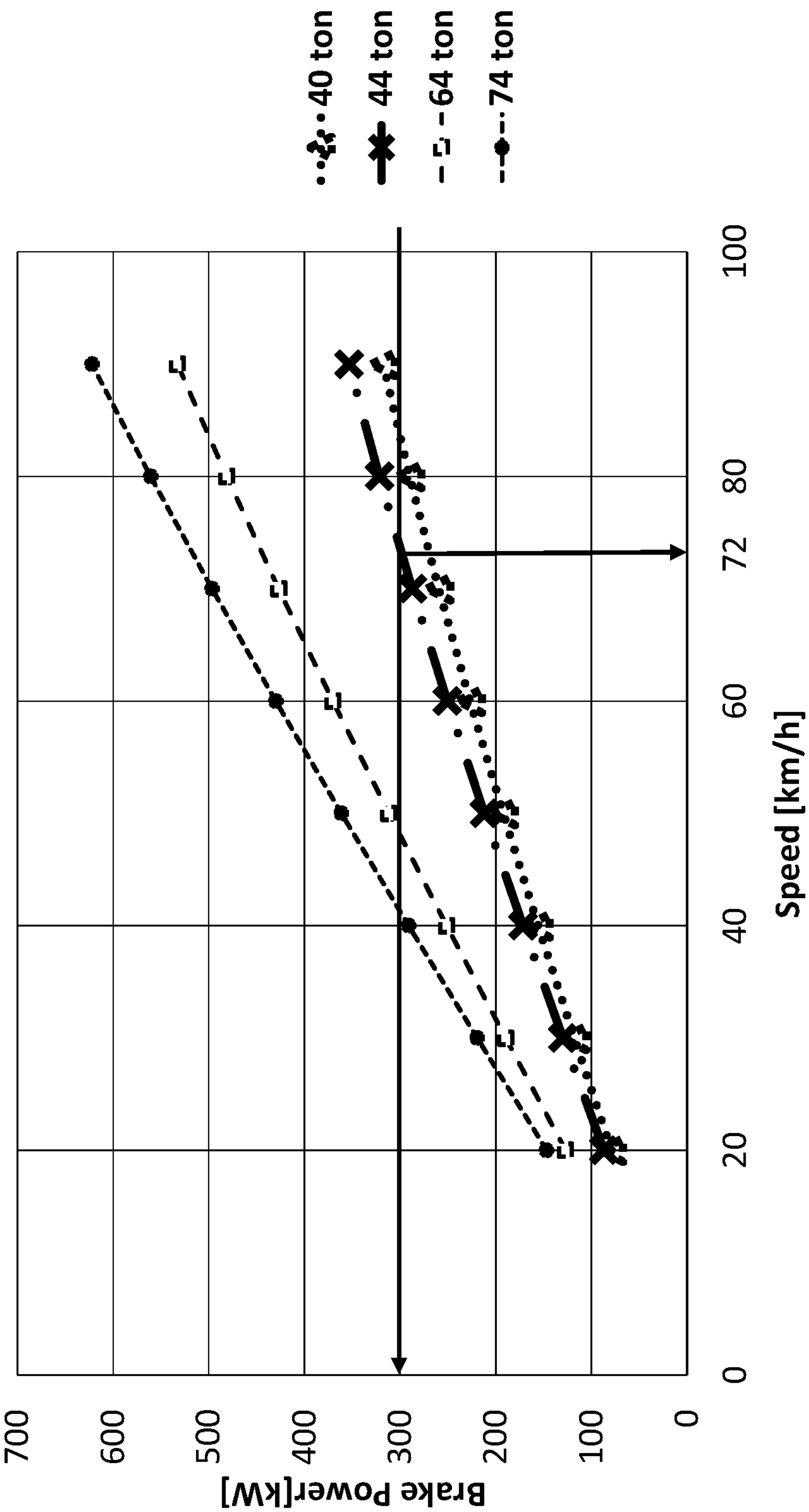
FIG. 4 is a schematic diagram illustrating brake power as dependent on vehicle speed for different vehicle weights.

FIG. 4 is a schematic diagram illustrating brake power as dependent on vehicle speed for different vehicle weights. The diagram illustrates a 5% grade of the downhill slope, under substantially normal aerodynamic conditions without any tail wind. Four lines are shown illustrating a respective Gross Combination Weight (GCW) of the vehicle, namely 40 tons, 44 tons, 64 tons and 74 tons.

The different lines can be calculated based on the following relationships:

$$BPtot = k \cdot (GF - RR - AR),$$

where

- BPtot is the total brake power, i.e. the values on the vertical axis;
- k is a combined efficiency coefficient which is based on the efficiencies of components such as rear-axle, gearbox, electric machine, inverter and batteries;
- GF is the grade force calculated as $mg \cdot \sin(\theta) \cdot v$, where m is the mass of the heavy duty vehicle (i.e. in FIG. 4 the value of the respective GCW is inserted as the mass m), g is the gravity, v is the speed of the vehicle (in FIG. 4 speed values are shown on the horizontal axis and BPtot has been calculated for speed values 20, 30, 40, 50, 60, 70, 80 and 90 km/h) and θ is arctan(grade/100), which in this case is arctan(5/100);
- RR is the rolling resistance calculated as $mg \cdot \cos(\theta) \cdot v$;
- AR is the aero resistance calculated as $$1/2 \cdot \rho \cdot CdA \cdot v^3,$$

wherein ρ is the density of air, and CdA is the coefficient of aerodynamic drag of the heavy-duty vehicle.

In the following discussion, it will be assumed that the vehicle can provide a brake power of 300 kW through regenerative braking. As illustrated by the arrows in FIG. 4, it can thus be seen that in this downhill slope of 5% grade, when the weight of the vehicle is 44 tons GCW, regenerative braking can maintain a vehicle speed of approximately 72 km/h along the downhill slope, without requiring any other type of braking. However, if the speed of the vehicle would be higher, say for example 90 km/h, then a total brake power of approximately 350 KW would be required to maintain the vehicle at 90 km/h in this downhill slope of 5% grade for a vehicle having 44 tons GCW. In such case, the exceeding 50 kW would need to be allocated to other braking, such as auxiliary braking and/or service braking. Although regenerative braking can provide a braking power of 300 kW it should now be understood from the discussion herein, that the processor device may still not determine to use regenerative braking even if the speed is at or below 72 km/h. As has be explained, the processor device will allocate the braking power in such way that the SOC target will not be exceeded. Thus, even though the speed is at or below 72 km/h, if the state of charge of the batteries is already at a high level near the SOC target, the processor device may determine to only allocate a small or no proportion of the total brake power to regenerative braking. The length of the downhill slope will affect how much energy that can be absorbed by regenerative braking, and the processor device may accordingly determine an appropriate proportion of the total brake power to be allocated to regenerative braking. The processor device may also take various other factors into consideration when determining an appropriate brake power distribution between the different brake systems. Some examples will now be discussed in connection with the illustration of FIG. 2.

Thus, turning back to FIG. 2, as mentioned previously, the vehicle may comprise a cooling system 28 for cooling the batteries 12 and/or power electronics of the vehicle. The processor device 20 may determine a threshold temperature of the coolant of the cooling system 28. Furthermore, the processor device 20 may control the speed of the vehicle, when the vehicle travels in the downhill slope, by applying the determined total brake power such that the temperature of the coolant remains below or equal to the threshold temperature throughout the travel in the downhill slope. For example, if the regenerative brake system 10 cannot on its own provide the total brake power without the SOC target being exceeded, then the auxiliary brake system 14 may provide a proportion of the total brake power as long as the threshold temperature is not exceeded. It the processor device 20 determines that the threshold temperature would be exceeded, then it could also engage the service brake system 16.

From the above, it can be understood that the processor device 20 may determine a brake power distribution of said total brake power to be applied. The determined brake power distribution can be a mixture of simultaneous regenerative braking and auxiliary braking (engaging systems 10 and 14), or regenerative braking and service braking (engaging systems 10 and 16), or auxiliary braking and service braking (engaging systems 14 and 16), or regenerative braking, auxiliary braking and service braking (engaging all three systems 10, 14 and 16). The processor device 20 may therefore apply the determined total brake power in the form of said determined brake power distribution.

The processor device 20 may determine, based on the obtained topographic data (e.g. obtained from GIS 22), a maximum energy that is recoverable through regenerative braking (using regenerative brake system 10) throughout the travel in the downhill slope without exceeding the SOC target and without exceeding the speed limit. Based on this determined maximum energy, the processor device 20 may then determine the brake power distribution, i.e. which one or ones of the brake systems 10, 14, 16 should be engaged and how much brake power they should provide.

One of the input devices/systems 24, 26 may for instance represent an ambient temperature sensor. The processor device 20 may from receive ambient temperature data (e.g. from such an ambient temperature sensor), wherein the ambient temperature data contains information about the ambient temperature. The processor device 20 may, as mentioned previously, also be in communication with the coolant system 28. The processor device may for example receive coolant temperature data (from the coolant system 28) containing information about the temperature of the coolant in the coolant system 28. Based on the received ambient temperature data and the received coolant temperature data, the processor device 20 may suitably determine said brake power distribution.

The processor device 20 may also be configured to determine the heat capacity of the coolant. The heat capacity of the coolant may for example be stored in an electronic memory which is accessible to the processor device 20, or the processor device 20 may calculate/estimate the heat capacity of the coolant by acquiring information about how much the temperature rises for a certain amount of heat energy supplied to the coolant. Based on the determined heat capacity of the coolant, the processor device 20 may suitably determine said brake power distribution.

The topographic data (e.g. from GIS 22) may suitably comprise information about the grade of the downhill slope. The processor device 20 may determine the total weight of the heavy duty vehicle including the weight of any trailing vehicle part. Regardless of how the processor device 20 determines the total weight of the vehicle, it may suitably determine the total brake power required for maintaining the speed of the vehicle at or below the selected speed limit based on the grade of the downhill slope and based on the determined total weight. Furthermore, based on the grade of the downhill slope and based on the total weight of the vehicle, the processor device 20 may also determine the maximum energy that is recoverable through regenerative braking throughout the travel in the downhill slope.

As regards determining the total weight, the are various conceivable possibilities for the processor device 20 to obtain the relevant information. For instance, the processor device 20 may receive weight information from vehicle weighing scales on which the vehicle may stand before it sets out for its destination. Another possibility is for the processor device to receive information from load sensors of the vehicle (for example, one of the illustrated input devices/systems 24, 26 could represent one or more load sensors). A further possibility is for the processor device 20 to receive weight information by manual input, e.g. the driver having knowledge of the weight of the cargo that has been loaded onto the vehicle (for example, one of the illustrated input devices/systems 24, 26 could represent a user interface).

From the discussions above, it should be understood that the processor device 20 may determine to provide a combined brake power selected from the different brake systems 10, 14, 16. Suitably, the service brake system 16 may engaged as a last resort, if the other brake systems 10, 14 are insufficient for a certain scenario. For instance, the processor device may determine a combined brake power deliverable from regenerative braking (using regenerative brake system 10) and auxiliary braking (using auxiliary brake system 14) without exceeding the SOC target. Upon determination that the deliverable combine brake power is insufficient to main the selected speed limit throughout the travel in the downhill slope (and without exceeding the SOC target), the processor device 20 may control the service brakes (of the service brake system 16) to provide additional brake power so as to maintain the speed at or below the selected speed limit throughout the travel in the downhill slope. Similarly, the processor device 20 may determine an aggregated brake power deliverable from regenerative braking (using regenerative brake system 10) and auxiliary braking (using auxiliary brake system 14) without exceeding said threshold temperature of the coolant of the cooling system 28. Upon determination that said deliverable aggregated brake power is insufficient to maintain said selected speed limit throughout the travel in the downhill slope (and without exceeding the threshold temperature), the processor device 20 may control the service brakes (of the service brake system 16) to provide additional brake power so as to maintain the speed at or below the selected speed limit throughout the travel in the downhill slope.

As discussed previously, the length of the downhills slope may be relevant for determining the maximum recoverably energy in the downhill slope. The topographic data (e.g. from GIS 22) may suitably comprise information about the length of the downhill slope. The processor device 20 may therefore determine the brake power distribution based on the length of the downhill slope. Furthermore, the processor device 20 may determine the said maximum energy based on the length of the downhill slope. Hereby, the processor device 20 may determine how much of the brake power can be allocated to regenerative braking so that the SOC target is not exceeded when energy is recovered in the batteries 12 through regenerative braking.

Figure 5:
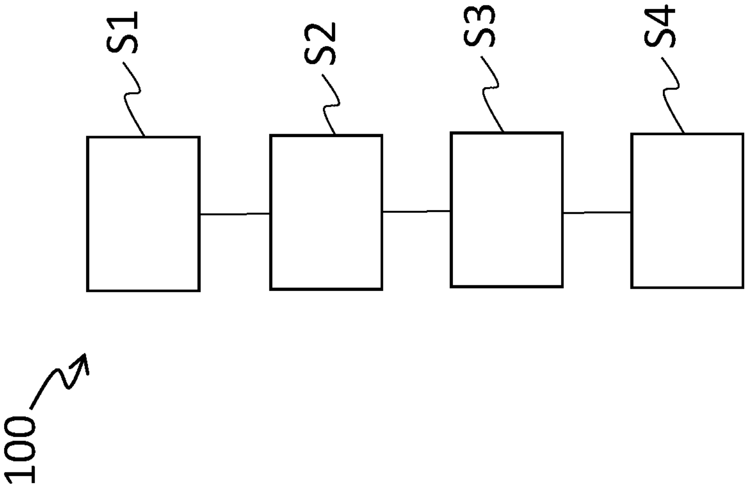
FIG. 5 is a schematic illustration of acts included in the method of the disclosure, in accordance with at least one example.

FIG. 5 is a schematic illustration of acts included in the method 100 of the disclosure, in accordance with at least one example. More specifically, FIG. 5 may schematically represent a computer-implemented method 100 of brake management in an electric or hybrid electric heavy-duty vehicle that has batteries which are configured to absorb energy from regenerative braking, the method comprising:

in a step S1, obtaining, by a processor device of a computer system, topographic data containing information about the topography of an upcoming part of a road along which the heavy-duty vehicle is currently travelling, the topographic data including information about an upcoming downhill slope, in a step S2, determining, by the processor device, a state of charge target (SOC target) below 100% for said batteries, in a step S3, determining, by the processor device, based on the obtained topographic data, a total brake power required for maintaining the speed of the heavy-duty vehicle at or below a selected speed limit of the heavy-duty vehicle throughout the travel in the downhill slope, the determined total brake power being in the form of at least one of regenerative braking, auxiliary braking and service braking of the heavy-duty vehicle, and in a step S4, controlling, by the processor device, the speed of the heavy-duty vehicle when travelling in said downhill slope, by applying said determined total brake power such that the state of charge of the batteries remains below or equal to said SOC target throughout the travel in the downhill slope.

The above mentioned steps do not necessarily need to be performed in the stated order. For instance, step S1 may be performed before, simultaneously with or after step S2.

Figure 6:
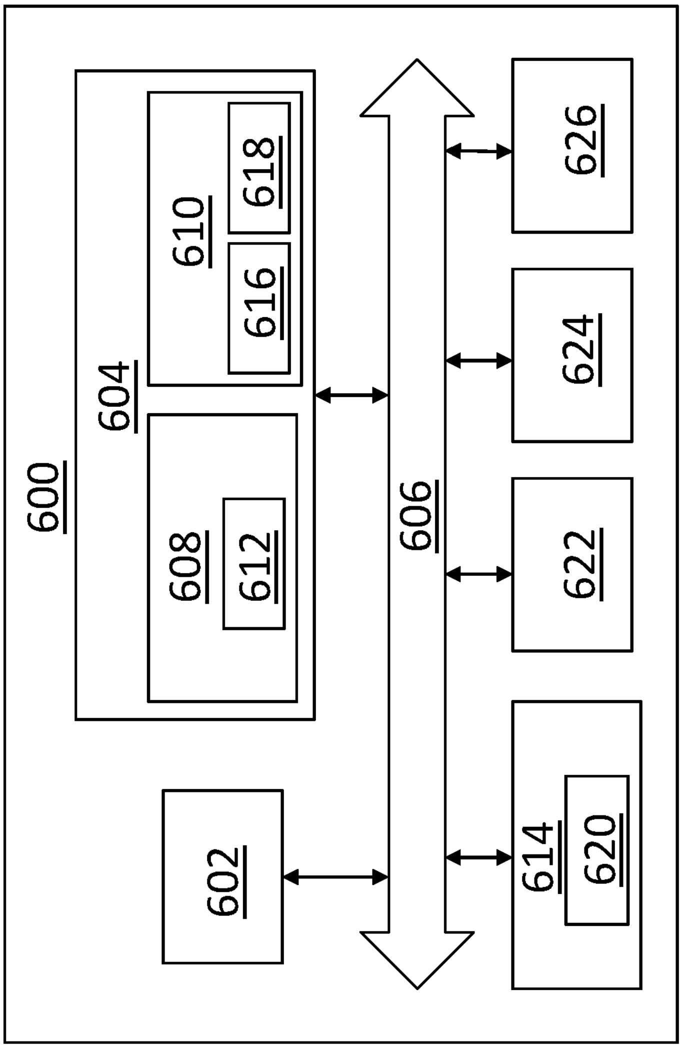
FIG. 6 is a schematic diagram of an exemplary computer system for implementing examples disclosed herein, according to one example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The processor device 602 may, for instance, correspond to the processor device 20 of FIG. 2. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Figure 7:
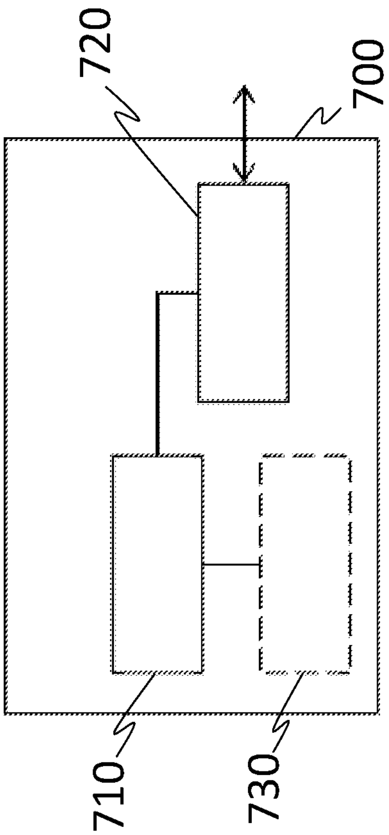
FIG. 7 schematically illustrates a processor device according to one example.

FIG. 7 schematically illustrates a processor device 700 according to one example. The processor device 700 in FIG. 7 may, for instance, correspond to the processor device 602 in FIG. 6 or the processor device 20 in FIG. 2. FIG. 7 illustrates, in terms of a number of functional units, the components of a processor device 700 according to exemplary embodiments of the discussions herein. The processor device 700 may be comprised in any working machine disclosed herein, thus in the form of an on-board processor device 700, or as it may be comprised in a remote facility, such as in an office or in a cloud-based solution as discussed herein. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 710 may further be provided as at least one application specific integrated circuit ASIC, or field programmable gate array FPGA.

Particularly, the processing circuitry 710 is configured to cause the processor device 700 to perform a set of operations, or steps, such as the method discussed in connection to FIG. 5 and others examples discussed throughout this disclosure. For example, the storage medium 730 may store the set of operations, and the processing circuitry 710 may be configured to retrieve the set of operations from the storage medium 730 to cause the processor device 700 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The processor device 700 may further comprise an interface 720 for communications with at least one external device such as temperature sensor, speed sensor, GPS system, batteries and the brake systems discussed herein. As such, the interface 720 may comprise one or more transmitters and receivers, comprising analogue and digital components and a suitable number of ports for wireline or wireless communication.

The processing circuitry 710 controls the general operation of the processor device 700, e.g. by sending data and control signals to the interface 720 and the storage medium 730, by receiving data and reports from the interface 720, and by retrieving data and instructions form the storage medium 730. Other components, as well as the related functionality, of the processor device 700 are omitted in order not to obscure the concepts presented herein.

Figure 8:
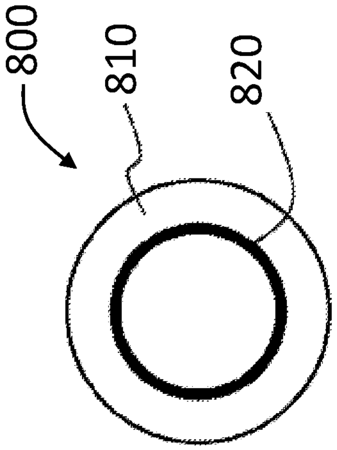
FIG. 8 schematically illustrates a computer program product according to one example.

FIG. 8 schematically illustrates a computer program product according to one example. More specifically, FIG. 8 illustrates a non-transitory computer-readable storage medium 810 carrying a computer program comprising program code means 820 for performing the methods exemplified in FIG. 5 and any examples thereof, when executed by the processor device. The computer-readable storage medium 810 and the program code means 820 may together form the computer program product 800.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer-implemented method of brake management in an electric or hybrid electric heavy-duty vehicle that has batteries which are configured to absorb energy from regenerative braking, the method comprising:

obtaining, by a processor device of a computer system, topographic data containing information about the topography of an upcoming part of a road along which the heavy-duty vehicle is currently travelling, the topographic data including information about an upcoming downhill slope, determining, by the processor device, a state of charge target (SOC target) that is below 100% for said batteries, determining, by the processor device, based on the obtained topographic data, a total brake power required for maintaining the speed of the heavy-duty vehicle at or below a selected speed limit of the heavy-duty vehicle throughout the travel in the downhill slope, the determined total brake power being in the form of at least one of regenerative braking, auxiliary braking and service braking of the heavy-duty vehicle, controlling, by the processor device, the speed of the heavy-duty vehicle when travelling in said downhill slope, by applying said determined total brake power such that the state of charge of the batteries remains below or equal to said SOC target throughout the travel in the downhill slope, determining, by the processor device, the total brake power, $Bp^{tot}$, based on the following relationships:

$$BP^{tot} = k \cdot (GF - RR - AR),$$

where k is a combined efficiency coefficient which is based on the efficiencies of components including a rear-axle, gearbox, electric machine, inverter and batteries;

GF is the grade force calculated as mg*sin(Θ)*ν, where m is the mass of the heavy duty vehicle, g is the gravity, ν is the speed of the vehicle and Θ is arctan (grade/100);

RR is the rolling resistance calculated as mg*cos(Θ)*ν; and

AR is the aero resistance calculated as ½*p*CdA*$v^3$, wherein p is the density of air, and CdA is the coefficient of aerodynamic drag of the heavy-duty vehicle.

2. A control system comprising the processor device configured to perform the method of claim 1.

3. The method of claim 1, wherein the heavy-duty vehicle comprises a cooling system for cooling said batteries and/or power electronics of the vehicle, the method further comprising:

determining, by the processor device, a threshold temperature of a coolant of the cooling system, and controlling, by the processor device, the speed of the heavy-duty vehicle when travelling in said downhill slope, by applying said determined total brake power such that the temperature of the coolant remains below or equal to said threshold temperature throughout the travel in the downhill slope.

4. The method of claim 1, further comprising:

determining, by the processor device, a brake power distribution of said total brake power to be applied, said determined brake power distribution being a mixture of simultaneous:

regenerative braking and auxiliary braking, regenerative braking and service braking, auxiliary braking and service braking, or regenerative braking, auxiliary braking and service braking, wherein said controlling of the speed by applying said determined total brake power, comprises:

applying said determined total brake power in the form of said determined brake power distribution.

5. The method of claim 4, further comprising:

determining, by the processor device, based on the obtained topographic data, a maximum energy that is recoverable through regenerative braking throughout the travel in the downhill slope without exceeding said SOC target and without exceeding said speed limit, and determining, by the processor device, said brake power distribution based on said determined maximum energy.

6. The method of claim 4, the further comprising:

receiving, by the processor device, ambient temperature data containing information about the ambient temperature and coolant temperature data containing information about the temperature of the coolant in the cooling system, and determining, by the processor device, said brake power distribution based on said received ambient temperature data and coolant temperature data.

7. The method of claim 6, further comprising:

determining, by the processor device, the heat capacity of the coolant, and determining, by the processor device, said brake power distribution based on said determined heat capacity.

8. The method of claim 1, wherein said topographic data comprises information about the grade of the downhill slope, the method further comprising:

determining, by the processor device, a total weight of the heavy-duty vehicle, wherein said act of determining the total brake power required for maintaining the speed of the heavy-duty vehicle at or below the selected speed limit, comprises determining the total brake power based on the determined total weight and the grade of the downhill slope.

9. The method of claim 8, further comprising:

determining, by the processor device, a maximum energy based on the determined total weight and grade of the downhill slope.

10. The method of claim 1, further comprising:

determining, by the processor device, a combined brake power deliverable from regenerative braking and auxiliary braking without exceeding said SOC target, and upon determination that said deliverable combined brake power is insufficient to maintain said selected speed limit throughout the travel in the downhill slope, controlling, by the processor device, service brakes of the heavy-duty vehicle to provide additional brake power so as to maintain the speed at or below said selected speed limit throughout the travel in the downhill slope.

11. The method of claim 10, further comprising:

determining, by the processor device, an aggregated brake power deliverable from regenerative braking and auxiliary braking without exceeding said threshold temperature of the coolant, and upon determination that said deliverable aggregated brake power is insufficient to maintain said selected speed limit throughout the travel in the downhill slope, controlling, by the processor device, service brakes of the heavy-duty vehicle to provide additional brake power so as to maintain the speed at or below said selected speed limit throughout the travel in the downhill slope.

12. The method of claim 1, wherein said topographic data comprises information about the length of the downhill slope, the method further comprising:

determining, by the processor device, a brake power distribution based on the length of the downhill slope.

13. The method of claim 12, further comprising:

determining, by the processor device, said maximum energy based on the length of the downhill slope.

14. The method of claim 1, wherein said auxiliary braking is performed by the processor device activating a mechanical retarder and/or an electric brake resistor of the heavy-duty vehicle.

15. The method of claim 1, wherein the topographic data is obtained from a Geographic Information System (GIS).

16. A vehicle comprising the processor device to perform the method of claim 1.

17. A control system comprising one or more control units configured to perform the method according to claim 1.

18. A non-transitory computer-readable storage medium comprising instructions, which when executed by the processor device, cause the processor device to perform the method of claim 1.

* * * * *